United States Patent
Espinal

[11] Patent Number: 6,123,750
[45] Date of Patent: Sep. 26, 2000

[54] SPRAY AND AERATION SYSTEM FOR REMOVING VOLATILE COMPOUNDS

[75] Inventor: Daniel Espinal, Windham, N.H.

[73] Assignee: New England Radon, Ltd, Salem, N.H.

[21] Appl. No.: 09/183,150

[22] Filed: Oct. 30, 1998

[51] Int. Cl.[7] .......................... B01D 47/02; B01D 47/06; B01D 47/12; B01F 3/04

[52] U.S. Cl. .................. 95/245; 95/263; 96/203; 96/157; 96/206; 96/352; 261/117; 261/124

[58] Field of Search .............................. 96/202, 203, 204, 96/265, 352, 157, 206; 95/245, 243, 263, 260; 261/116, 124, 117

[56] References Cited

U.S. PATENT DOCUMENTS 4,869,832  9/1989  Lamarre ..................................... 95/263

FOREIGN PATENT DOCUMENTS

| 2000037 | 4/1990 | Canada ..................................... 96/202 |
| 425941 | 5/1991 | European Pat. Off. .................. 96/203 |
| 782822 | 11/1980 | U.S.S.R. .................................... 96/202 |
| 1754146 | 8/1992 | U.S.S.R. .................................... 96/203 |

*Primary Examiner*—David A. Simmons
*Assistant Examiner*—Robert A. Hopkins
*Attorney, Agent, or Firm*—Davis and Bujold

[57] ABSTRACT

An aeration system for removing radon and other volatile compounds from a water or other liquid source. Water supplied from a well and/or water pressure/storage tank enters an aeration tank and is sprayed through a clog resistant nozzle. The nozzle creates a cone shaped spray of very fine water droplets or particles. Such spraying exposes the maximum amount of water surface area to the air stream and hence removes about 50% of the existing radon and other volatile compounds contained within the water. The sprayed water is then collected and fills the aeration tank and the collected water is then exposed to a source of high pressure, filtered air which is blown through a conventional sparger to vigorously agitate and aerate the sprayed and collected water in the aeration tank thereby removing any remaining radon and other volatile compounds from the water. The purified water is then re-pressurized and conveyed to the end user facility for use while the radon and other volatile compounds from the water removed from the water are exhausted to the outside environment.

20 Claims, 3 Drawing Sheets

SPRAY AND AERATION SYSTEM FOR REMOVING VOLATILE COMPOUNDS

FIELD OF THE INVENTION

This invention relates to an apparatus and method for removing volatile contaminants from well water, in particular, removing radon and other gaseous compounds which pose significant potential health risks to riparian property owners.

BACKGROUND OF THE INVENTION

It is known in the art that removal of harmful contaminants from water is essential to the health, safety and welfare of individuals and the public at large. It is of particular importance to ensure the adequacy of potable water supplies as these supplies become increasingly burdened and threatened by pollutants and other contaminants. In particular, there is substantial concern regarding the long term effects on humans of particularly volatile compounds such as hydrogen sulfide, methane, VOC's (volatile organic compounds), radon, etc., all of which can be found infiltrating and contaminating existing water supplies.

The typical procedure for removing volatile gaseous components from a contaminated water supply is by aeration of the water. Aeration is the process of contacting water with a supply of air and is currently the most preferred method of removing the above mentioned volatile compounds prior to domestic use of water. In conventional aeration processes, generally as much air as possible is introduced into a liquid in order to provide an increased water surface area for absorption of gases, volatile or otherwise, dissolved within the liquid to be aerated.

According to one known system, a supply of potentially contaminated water is conveyed across a large tray or a series of trays as a thin, laminar sheet to increase the exposed surface area of the water to as much air as possible in order to create diffusion of as much of the saturated, contaminating volatile gases as possible. The saturated, contaminating volatile gases removed by this prior art system are then vented to the outside atmosphere.

With reference to FIG. 1, a brief description concerning a second known prior art system will now be discussed. This system has a water inlet which supplies potentially contaminated water from a well or any desired water source, and stores the water in a contaminated water storage tank ST. A solenoid control valve controls the flow rate of contaminated water to the aerating tank AT with the valve control being controlled by conventional sensors located within the aerating tank AT. The water thus flows from the contaminated water storage tank ST into the aerating tank AT and fills a number of sequentially arranged aeration chambers AC formed within the aerating tank AT. Each one of the aeration chambers AC, in the aerating tank AT, contains a segment of a bubble diffuser BD from which forced air emanates to cleanse the water situated in each one of the aeration chambers AC. The air is forced through the bubble diffuser BD and into the separate aeration chambers AC by a conventional blower and the air, after passing through the water and scrubbing contaminates therefrom, rises to the surface of the water and exits the aerating chamber AC via an exhaust outlet EO and is conveyed to the outside ambient environment.

The cleansed or scrubbed water then exits the aeration tank AT and enters a water output pipe. Because the water has become depressurized while being treated within the aeration chamber AC, a pump RP is necessary to re-pressurize the treated water to a desired water pressure, e.g. the typical household water pressure is generally between 30–60 psi. The re-pressurized water is conveyed either into a treated water storage tank ST or directly to the end user facility.

One major drawback with both of the above known prior art volatile contamination removal systems is that they generally operate solely by a single aeration method of the supplied water.

These aeration systems exemplify the gaseous diffusion process whereby gases tend to flow from a medium including a high concentration of a gas to another medium having a lower concentration of the gas. Between the two mediums, the diffusing gas must pass through a boundary layer and, in general, the greater the surface area of the boundary layer the more gas which is induced to diffuse across the boundary layer. In any gaseous diffusion process, the extent to which any saturated gas will diffuse across a unit area of fluid boundary layer is dependant upon a fixed coefficient derived from the nature and characteristics of the diffusing media, the boundary layer between them and the saturated gas. Thus, the greater the unit area of boundary layer between the fluids, the greater the amount of gas which can diffuse across the boundary layer. The practical significance of this is that the more air to water boundary layer contact which can be accomplished, the greater the rate of diffusion of harmful saturated volatile compounds and other particles from the water and into the diffusing air.

To the extent that air bubble diffusers are adequate in removing many contaminants from water, there is a great need to increase the efficiency and efficacy of such existing systems to produce healthy potable water. For this reason, there is a great need to provide a greater air to water boundary layer contact and increase the rate of diffusion to remove a higher percentage of contaminants from the water within a shorter time period.

SUMMARY OF THE INVENTION

Wherefore, it is an object of the present invention to provide a water treatment process having an increased amount of air to water contact, within an aeration tank, in order to increase the rate of diffusion of the volatile contaminants from the water into the diffusing air.

Another object of the invention is to provide an efficient aeration system whereby a greater amount of contaminants are removed from the water during a shorter period of time with less required energy, thus allowing a greater flow rate of water through the system as well as increased savings in costs.

Another object of the invention is to provide a two stage system/process in which the water is first sprayed, as small water particles or droplets, into a purifying air or gas stream and the water droplets then collect in a bottom region of the aeration tank and secondly the collected water droplets are subjected to forced air or gas creating bubbles which further cleanse any remaining volatile contaminated gases from the collected water droplets as the air percolates through the collected water.

A still further object of the invention is to provide a system which completely exhausts all of the removed volatile contaminated gases from the aeration tank to the outside atmosphere.

A further object of the invention is to provide a system for removing the aforementioned volatile gases which is readily compatible for use in combination with other conventional contaminate removal and/or water purification systems, such as systems which remove minerals, deposits, etc.

Another object of the invention is to provide a relatively maintenance free system which ensures reasonable economical operation while still ensuring removal of substantially all of the volatile contaminants from water which is to be used as residential drinking water.

The present invention relates to a system for removing volatile contaminants from a liquid to be treated, said system comprising: an aeration tank having a liquid inlet and a liquid outlet, and the aeration tank also having a gas inlet and a gas outlet; a spray nozzle communicating with the liquid inlet to receive a supply of liquid and for spraying the supplied liquid to be treated as liquid droplets; and a sparger being located within the aeration tank, remote from the spray nozzle, and being connected to a source of air for supplying air to a lower region of the aeration tank to facilitate, during operation, removal of any volatile contaminants contained within the liquid to be treated.

The present invention also relates to a method of treating a liquid to remove volatile contaminants contained therein, said method comprising the steps of: pumping the liquid to be treated from a contaminated liquid supply source to an aeration tank; spraying the pumped liquid, within the aeration tank, adjacent a top region of the aeration tank as liquid droplets; collecting the sprayed liquid droplets in a bottom region of the aeration tank; bubbling air or gas through the sprayed and collected liquid droplets to remove volatile contaminants contained within the sprayed and collected liquid; and supplying the sprayed and collected liquid, following the bubbling of air or gas through the sprayed and collected liquid droplets, to an end user facility for use.

BRIEF DESCRIPTION OF THE DRAWINGS

The invention will now be described, by way of example, with reference to the accompanying drawings in which.

DESCRIPTION OF THE PREFERRED EMBODIMENTS

Figure 2:
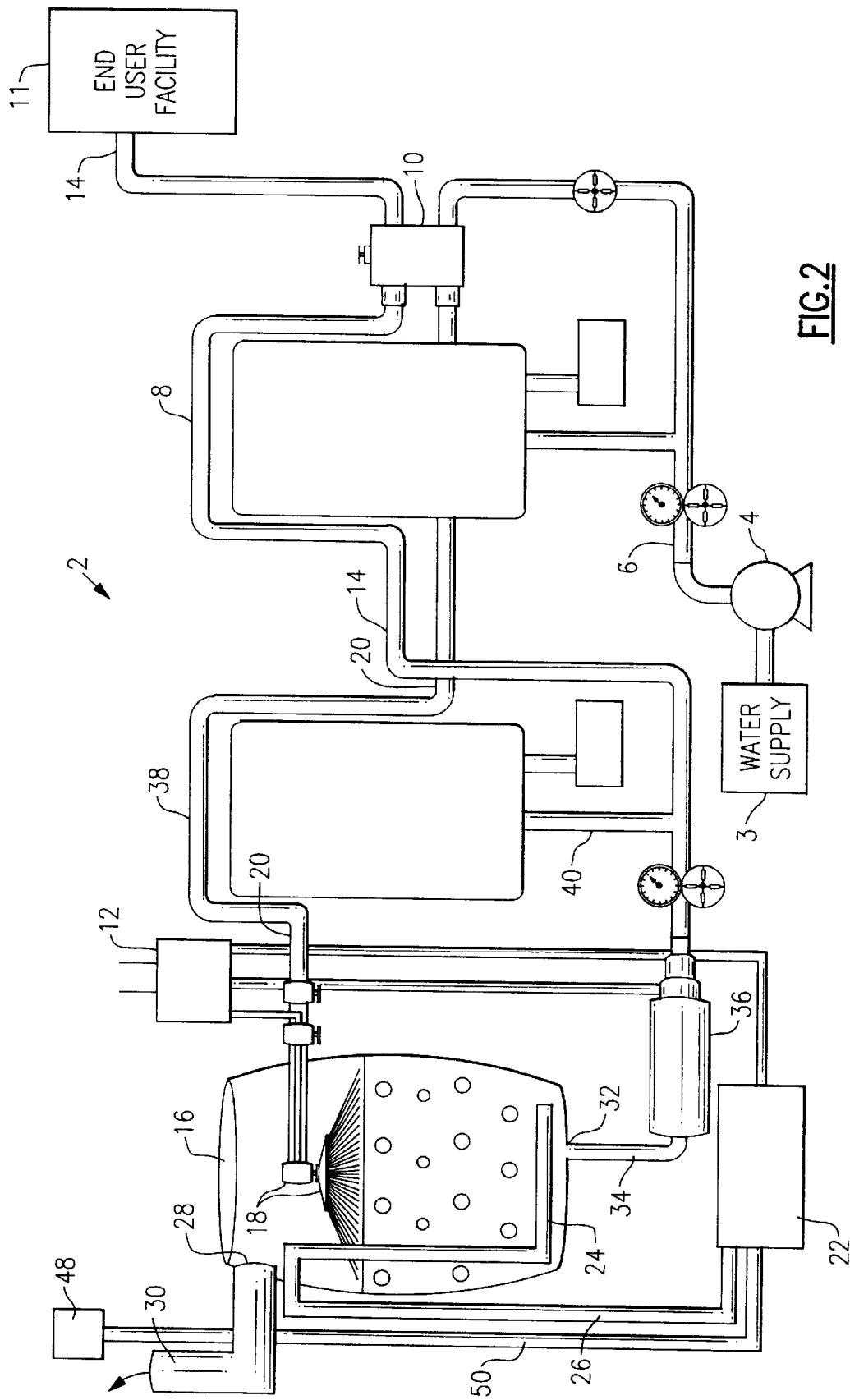
FIG. 2 is a diagrammatic view of the aeration system, according to the present invention, having a two stage spray and bubble diffuser aeration tank.

Turning now to FIG. 2, a detailed description concerning the basic components of the present invention will now be provided. As seen in this Figure, a pump 4, typically located within or adjacent a well 3 or some other liquid or water source, is connected to supply a source of potentially contaminated water, via a system contaminated inlet pipe 6, to a contaminated water pressure tank 8 for temporary storage of the water to be treated. A conventional bypass valve 10 is situated along the contaminated inlet pipe 6, preferably just prior to the contaminated water pressure tank 8, for bypassing the contaminant removal system 2 altogether and supplying the water directly to the end user facility 11, e.g. the house, the building, the business, etc., without passing through the contaminant removal system 2. Upon activation of the bypass valve 10, via an electronic control device 12 electrically coupled thereto, the supplied water is diverted by the bypass valve 10, in a conventional manner, into the water outlet supply pipe 14 and conveyed directly to the end user facility 11. Typically, the bypass valve 10 is activated when the water is to be used for purposes other than human consumption, e.g. for watering a lawn or garden, washing a vehicle, laundry, etc.

During operation of the system 2, the potentially contaminated water is supplied from the well 3 by the supply pump 4 to the pressure/storage tank 8, via the contaminated inlet pipe 6 and through the bypass valve 10. It is to be appreciated that a variety of conventional valves and other devices, e.g. pressure gauges, can be located along the supply and treated water pipes and tanks to provide relevant information concerning the system. As such teaching is well known in the art, a further detailed discussion concerning the same is not provided. The pressure/storage tank 8, in turn, conveys a portion of the stored water to a top region of an aeration tank 16 via a contaminated supply line 20. A spray nozzle 18 is attached at a remote end of the contaminated supply line 20 to facilitate spraying of the water into the aeration tank 16. The aeration tank 16 is generally a 55 gallon tank but it is to be appreciated that the size and shape of this tank can vary, i.e. be increased or decreased depending upon the quantity of potable water the system is specifically designed to treat or handle.

The supplied water is discharged into the top region of the aeration tank 16, via the spray nozzle 18, and is exposed to a supply of air, passing through the system 2, which partially removes any radon and/or other volatile contaminants from the sprayed water, a further discussion concerning such removal feature will follow. The sprayed water then condenses and/or collects in a bottom region of the aeration tank 16. This sprayed and collected water is next exposed to a supply of air or selected gas, supplied by a blower 22 connected to sparger 24 via an air supply conduit 26, to remove any remaining radon and/or other volatile contaminants still remaining in the sprayed and collected water, and a further discussion concerning such further removal will follow.

The air supplied by the sparger 24 bubbles and/or permeates through the sprayed and collected water in the aeration tank 16 and this air then communicates with the sprayed water, to remove any radon and/or other volatile contaminants contained within the sprayed water, and the air, including any removed radon and/or other volatile contaminants, is finally exhausted from the aeration tank 16 to the exterior environment, i.e. outside the end user facility. The air and/or any removed radon or other contaminants are exhausted via a gas exhaust outlet 28, provided in a top most region of the aeration tank 16, which is coupled to an air exhaust conduit 30.

The treated water exits from the aeration tank 16, via a water outlet 32 located in a bottom most region of the aeration tank 16. Preferably the water outlet 32 is located at a level below the level of the sparger 24. A treated liquid or water pipe 34 connects the water outlet 32 to an inlet of a jet or re-pressurization pump 36 which re-pressurizes the treated water back to the normal operating pressure of the end user facility 11 or, if desired, to a higher operating pressure. It is to be appreciated that once the water is sprayed, via spray nozzle 18, the water is no longer pressurized and the water is thus substantially at atmospheric pressure.

An outlet of the jet or re-pressurization pump 36 is connected to the treated water outlet pipe 14 to supply the treated and re-pressurized water directly to the end user facility 11. Alternatively, the jet or re-pressurization pump 36 can convey the treated water to a treated pressurized water supply tank 38, via a treated water pipe 40, where the treated and re-pressurized water is temporarily stored at a desired pressure for later use by the end user facility 11. In either case, the treated and re-pressurized water is now potable as the contaminant removal system 2 is readily able to remove about 95% of the radon and/or other volatile contaminants from the water, and most preferably will remove about 99% of the radon and/or other volatile contaminants from the water.

Figure 1:
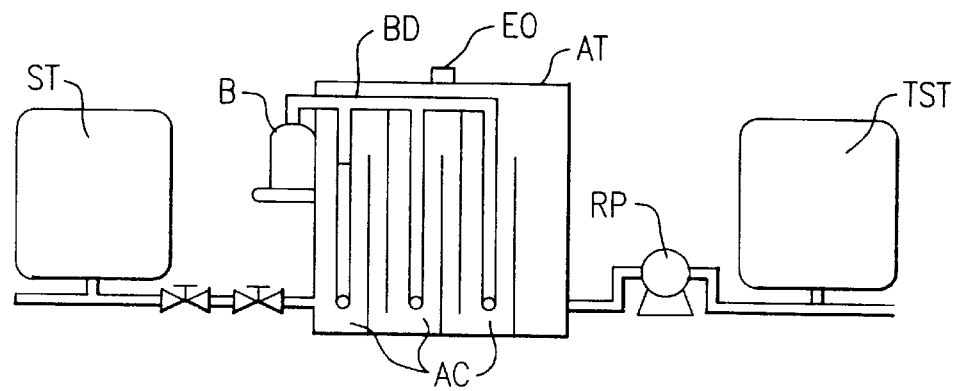
FIG. 1 is a diagrammatic view of a diffused bubble aeration apparatus according to the prior art.
Figure 3:
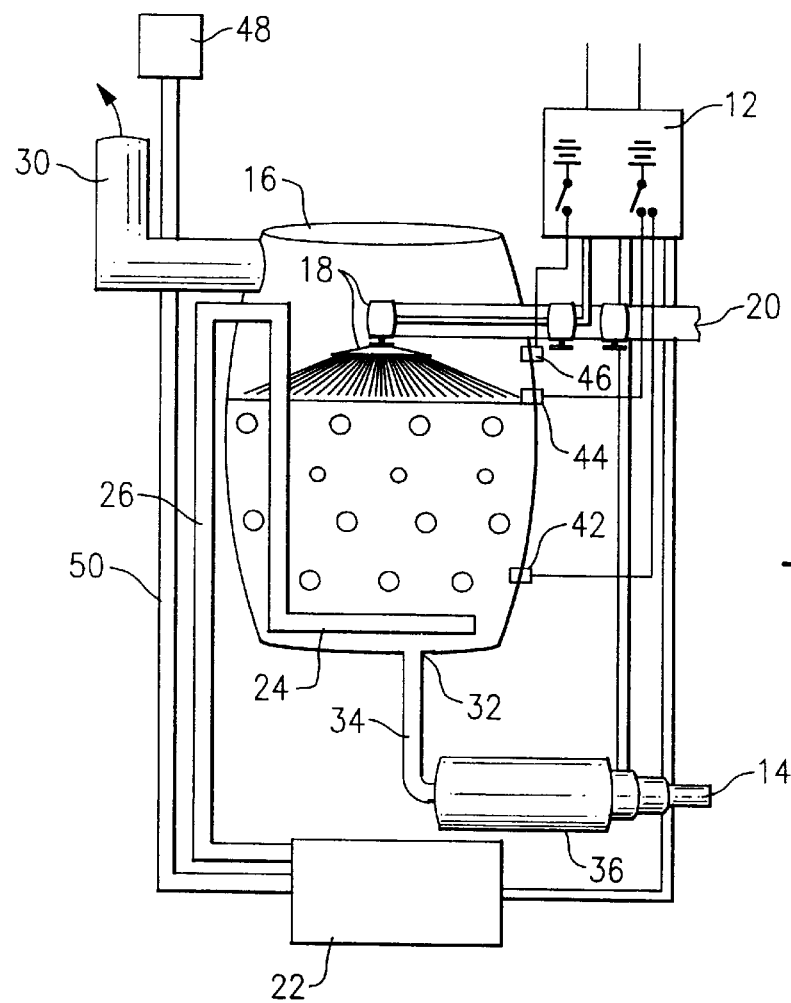
FIG. 3 is an enlarged diagrammatic view of only the spray nozzle, the bubble diffuser and the aeration tank.
Figure 4:
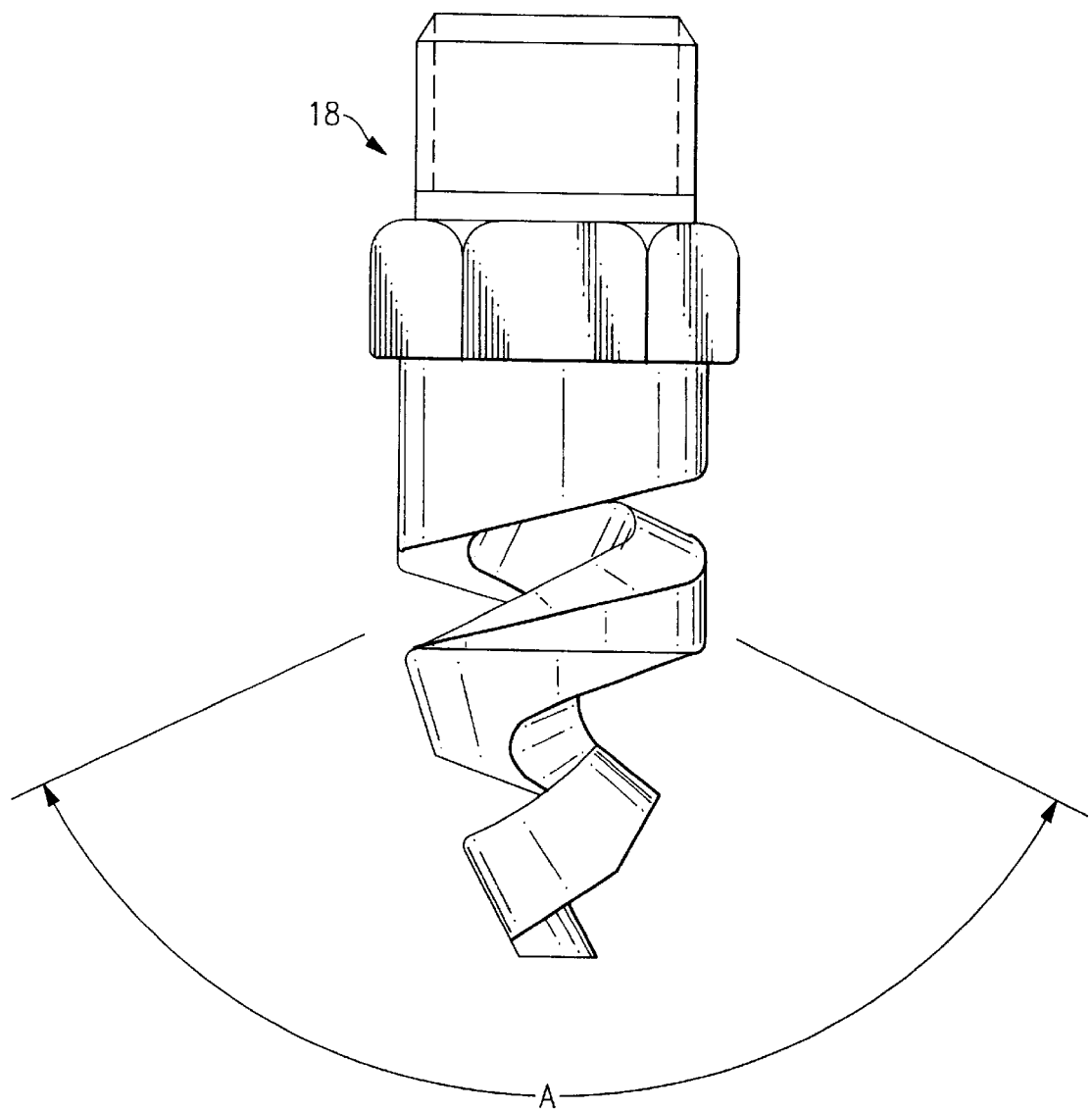
FIG. 4 is a diagrammatic view of a preferred spray nozzle for use in the aeration tank.

With reference now to FIGS. 2–4, a more detailed description concerning the novel features of the aeration tank 16 will now be provided. As stated above, the water to be treated is discharged via the spray nozzle 18 into the top region of the aeration tank 16, e.g. the top ¼–⅓ of the tank. The spray nozzle 18 is a specially designed clog resistant nozzle (see FIG. 4) which dispenses the water in a cone shaped spray pattern of very fine water droplets or particles. The conical spray pattern has an internal angle A of between 90° and 170°, more preferably and angle of between 110° and 150° and most preferably an angle of about 120°. Such spraying of the water is designed to expose a maximum amount of surface area of the sprayed water to the air stream passing through the aeration tank 16, from the sparger 24 to the gas exhaust outlet 28, to assist with removing approximately 50% of any dissolved radon and/or other volatile contaminants contained within the sprayed water. The sprayed fine droplets, particles and/or mist or being exposed to the air forms the first volatile contaminant removal stage of the present invention.

The sprayed and partially aerated water particles and droplets readily collect in a bottom region of the aeration tank 16, e.g. the bottom ¾–⅔ of the tank, and over the course of time gradual increase the water level contained within the aeration tank 16 to a desired operating level, e.g. about ⅔ to about ¾ of the total volume of the aeration tank 16. A pair of liquid level sensors 42, 44 are located within the aeration tank 16 to maintain the water or liquid level within the aeration tank 16 between a desired operating range. A further discussion concerning the liquid level sensors will follow below.

The spraying of fine droplets, particles and/or mist of contaminated water from the spray nozzle 18 creates a significantly increased surface area of the water for aeration with the air stream contained within the aeration tank 16. These water droplets or particles typically have a diameter ranging between and 0.1 to 1.0 mm, or preferably have a particle diameter ranging between 0.2 and 0.8, and most preferably have a particle diameter of about 0.5 mm. The interaction between the spray water and the conveyed air generally provides a removal of approximately 50% of the existing radon and/or other volatile contaminants contained within the sprayed water. The water that collects in the bottom region of the aeration tank 16 is next exposed to a second treatment stage. In particular, high pressured, filtered air is blown from the blower 22, via the air supply conduit 26, through a conventional sparger 24 that vigorously agitates and aerates the sprayed and collected water to remove any remaining radon or other volatile contaminants contained therein. The sprayed and collected water fills the aeration tank 16 to a volume of about 40 gallons or so and the partially filled aeration tank 16 creates head space in the top region thereof to facilitate adequate spraying area of the water from the nozzle 18. The head space is defined as the distance between the lower most outlet of the spray nozzle 18 and the top surface of the water contained within the aeration tank 16.

In order to maintain the water in the aeration tank 16 at a desired operating level, a first liquid level sensor 42 is located in the bottom region of the aeration tank 16 and sends a signal to the electronic control device 12, when the liquid level in the aeration tank 16 is detected below a desired liquid level, to commence supplying water from the pump 4 and/or the pressure/storage tank 8 to the aeration tank 16. In addition, the aeration tank 16 is provided with a second liquid level sensor 44, located in a top central region of the aeration tank 16, which sends a signal to the electronic control device 12, when the liquid level in the aeration tank 16 is detected at or above a desired liquid level, to stop supplying water from the well 3 and/or the pressure/storage tank 8 to the aeration tank 16. A third liquid level sensor 46 can also be provided, in the top most region of the aeration tank 16, just below the height of the spray nozzle 18, for ensuring that the supply of water to the aeration tank 16 is shut off in the event that the second liquid level sensor 44 fails, for some reason or another. The third liquid level sensor 46 is also connected to the electronic control device 12 and sends a signal thereto when the liquid level in the aeration tank 16 is detected at or above a level of the third liquid level sensor 46. It is to be appreciated that as the liquid level sensors, according to the present invention, are conventional liquid level sensors, a further detailed description concerning the same is not necessary.

The volume of water contained within the aeration tank 16 is vigorously agitated and aerated by the conventional sparger 24 to provide a second treatment stage of gaseous diffusion and thus allow a further amount of saturated gases to be removed from the water.

The regeneration blower 22 provides the filtered air, via an external air intake filter 48 and air supply line 50, and introduces the filtered air via the bubble diffuser 24 into the sprayed and collected water. This second stage of purification generally continues to scrub the sprayed and collected water for a total elapsed time of 17–22 minutes or so following initiation of the spraying.

The flow of the water, to be treated, into the aeration tank 16 and/or the pressure/storage tank 8 is controlled by the electronic control device 12 which is electrically coupled to the pump 4 connected to the well 3, by wiring not shown, as well as being electrically coupled to a variety of valves and gauges located throughout the system 2 to control the flow through the system 2. The electronic control device 12 is electrically coupled to a conventional power source (not shown).

The cone shaped spray of mist of very fine droplets is created by a spiral nozzle as shown in FIG. 4. The use of a spiral nozzle creates the advantages of: 1) a constant spray pattern regardless of the pressure of the water supplied to the nozzle (this is important as household water pressures may vary or fluctuate between 30–60 psi); and 2) small sized particles or droplets for exposing as much surface area of the water to the air as possible. The nozzle 18 is selected so as to produce sprayed droplets having a diameter size ranging between about 0.1 and 1.0 mm and most preferably about 0.5 mm in size.

The present invention can be used with other known water treatment apparatuses and, in particular, an apparatus which at least removes iron constituents from the water supply to prevent oxidation of the iron in the water, when treated with the air provided by the system according to the present invention, to prevent the iron from converting into iron oxide and forming a brown colored water.

The present invention is typically designed to treat water at the rate of between about 5 to 20 gallons per minutes and more preferably about 7 to 8 gallons per minutes. But larger or smaller flow rates are within the spirit and scope of the present invention.

The head space, according to the present invention, generally ranges between 7 and 16 inches or so to ensure adequate spray space or area. The adequate head space ensures removal of any radon and other volatile constituents and contaminants from the sprayed water. In the event that this minimum head space is not maintained, the effectiveness for removing the radon and other volatile contaminants from the sprayed water is somewhat compromised and decreased.

The nozzle 18 may be any conventional spray nozzle, but one preferable nozzle is a TF spiral nozzle manufactured and sold by Bete Fog Nozzle Company of Greenfield Massachusetts.

It is to be appreciated that the present invention is applicable to large commercial and industrial aeration applications while being particularly suited for removal of contaminants from well water for residential proposes.

Since certain changes may be made in the above described system, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Wherefore, I/we claim:

1. A system for removing volatile radon contaminants from fresh water to be treated, said system comprising:

an aeration tank comprising an upper region and a lower region together defining an interior without any packing material located within the interior, and the aeration tank having a fresh water inlet and a fresh water outlet and also having an air inlet and an air outlet for discharging air along with any volatile radon contaminants removed from fresh water to be treated;

a spray nozzle communicating with the fresh water inlet for receiving a supply of the fresh water to be treated and for spraying the supplied fresh water to be treated as fresh water droplets within the interior of the aeration tank in a desired fresh water spray pattern to increase an exposed surface area of the fresh water to be treated with supplied air and facilitate first stage removal of approximately 50% any radon contaminants contained within the sprayed fresh water particles, and, during operation of the system, the spray nozzle spraying the fresh water to be treated directly on any fresh water which accumulates within the lower region of the aeration tank;

a sparger being located within the lower region of the aeration tank, remote from the spray nozzle, and being connected to a source of air for supplying air to the lower region of the aeration tank, once a desired level of the sprayed fresh water has accumulated therein, such that the sparger is completely immerse by the sprayed fresh water which has accumulated so that the air supplied by the sparger permeates through the fresh water accumulated within the interior of the aeration tank to provide a second stage removal of any remaining volatile radon contaminants contained within the fresh water to be treated; and a treated fresh water line connects the fresh water outlet of the aeration tank to a re-pressurization pump, and the re-pressurization pump pressurizes and supplies the treated fresh water to an end user facility for subsequent use whereby the treated fresh water is approximately 95% free of radon contaminants.

2. The system according to claim 1, wherein a fresh water supply line connects a fresh water supply pump to the fresh water inlet of the aeration tank for conveying the fresh water to be treated to the spray nozzle.

3. The system according to claim 1, wherein afresh water tank is connected along the fresh water supply line for storing a desired quantity of the fresh water to be treated by the system.

4. The system according to claim 2, wherein a treated fresh water tank is connected along the treated fresh water line for storing a desired quantity of the fresh water treated by the system for subsequent use by the end user facility.

5. The system according to claim 2, wherein a bypass valve is connected to both the contaminated fresh water supply line and the treated fresh water line for bypassing the system and supplying the fresh water directly to the end user facility without treatment by the system.

6. The system according to claim 1, wherein the source of air is an air blower connected to the sparger, via the air inlet provided in the aeration tank, for supplying a desired quantity of room temperature air to the sparger, once a desired level of fresh water has accumulated within the aeration tank whereby the air supplied by the sparger permeates, during operation of the system, through the fresh water accumulated within the aeration tank to remove volatile radon contaminants contained therein; and the air supplied by the sparger, once the air completely permeates through the fresh water accumulated within the aeration tank, communicates with the fresh water sprayed by the spray nozzle, during operation of the system, to provide the initial stage removal of radon contaminants contained therein, prior to the air being exhausted from the aeration tank via the air outlet.

7. The system according to claim 1, wherein an electronic control device is connected to at least:

1) a contaminated fresh water supply pump for supplying fresh water to be treated to the aeration tank;

2) the re-pressurization pump for removing the treated fresh water from the aeration tank;

3) a bypass valve for bypassing the system and supplying the fresh water directly to the end user facility without treatment by the system; and 4) a blower for supplying air, at room temperature without the application of heat to the air, to the sparger for permeating air through the fresh water accumulated within the interior of the aeration tank.

8. The system according to claim 1, wherein the spray nozzle is located at a distance of between 7 and 16 inches from a top level of the fresh water accumulated within the interior of the aeration tank, during operation of the system, to facilitate the initial stage removal of the volatile radon contaminants from the sprayed fresh water.

9. The system according to claim 7, wherein a low fresh water level sensor is provided within the aeration tank and coupled to the electronic control device for sending a signal to the electronic control device indicating that a detected accumulated fresh water level in the aeration tank is low and additional fresh water is required in the aeration tank, and a high fresh water level sensor is provided in the aeration tank for sending a signal to the electronic control device for indicating that a detected accumulated fresh water level in the aeration tank is high and to discontinue the supply of additional fresh water to be treated to the aeration tank.

10. The system according to claim 9, wherein a third fresh water level sensor is provided within the aeration tank and coupled to the electronic control device for sending a signal to the electronic control device indicating that excess fresh water is accumulating in the aeration tank and the electronic control device, upon receiving a signal from the third fresh water level sensor, discontinues the supply of fresh water to be treated to the aeration tank.

11. The system according to claim 1, wherein the nozzle sprays the fresh water droplets which have an average diameter ranging between about 0.1 and 1.0 mm.

12. The system according to claim 1, wherein the spray nozzle has a substantially helical tip for imparting the conical spray pattern and creating the fresh water droplets.

13. A system for removing radon contaminants from a contaminated fresh water, said system comprising:

an aeration tank comprising an upper region and a lower region together defining an interior without any packing material located within the interior, and the aeration tank having a fresh water inlet and a fresh water outlet and also having an air inlet and an air outlet for discharging air along with radon contaminants removed from fresh water to be treated;

a fresh water supply line connecting a contaminated fresh water supply pump to the fresh water inlet of the aeration tank for conveying contaminated fresh water, from a contaminated fresh water source, to a spray nozzle;

the spray nozzle communicating with the fresh water inlet for receiving a supply of the contaminated fresh water and for spraying the supplied contaminated fresh water as fresh water droplets within the interior of the aeration tank in a desired fresh water spray pattern to increase an exposed surface area of the contaminated fresh water and facilitate an initial stage removal of any volatile radon contaminants contained within the sprayed fresh water particles, and, during operation of the system, the spray nozzle spraying the contaminated fresh water directly on any fresh water which has accumulated within the aeration tank;

a sparger being located within the lower region of the aeration tank, remote from the spray nozzle, and being connected to a source of air for supplying the air to the lower region of the aeration tank, once a desired level of the sprayed fresh water accumulated therein, such that the sparger is completely immerse by the sprayed fresh water accumulated within the lower region of the aeration tank so that the air, supplied by the sparger, permeates through the sprayed fresh water accumulated within the interior of the aeration tank to provide a second stage removal of any radon contaminants contained within the sprayed fresh water; and a treated fresh water line connects the fresh water outlet of the aeration tank to a re-pressurization pump, and the re-pressurization pump supplies the treated fresh water to an end user facility for subsequent use.

14. The system according to claim 13, wherein a contaminated fresh water tank is connected along the fresh water supply line for storing a desired quantity of the contaminated fresh water by the system;

a treated fresh water tank is connected along the treated fresh water line for storing a desired quantity of the treated fresh water for subsequent use by the end user facility; and a bypass valve is connected to both the contaminated fresh water supply line and the treated fresh water line for bypassing the system and supplying the contaminated fresh water directly to the end user facility without treatment by the system.

15. The system according to claim 13, wherein an electronic control device is connected to:

1) the contaminated fresh water supply pump for controlling the supplying of the contaminated fresh water to the aeration tank;

2) the re-pressurization pump for controlling removal of the treated fresh water from the aeration tank;

3) a low fresh water level sensor, provided within the aeration tank, for sending a signal to the electronic control device indicating that a detected accumulated fresh water level within the aeration tank is low and a supply of additional contaminated fresh water is required in the aeration tank; and 4) a high fresh water level sensor, provided in the aeration tank, for sending a signal to the electronic control device to indicate that a detected accumulated fresh water level in the aeration tank is high and to discontinue the supply of additional contaminated fresh water to the aeration tank.

16. A method of treating a fresh water to remove radon contaminants contained therein, said method comprising the steps of:

forming an aeration tank with an upper region and a lower region which together define an interior without any packing material located within the interior, and providing the aeration tank with a fresh water inlet and a fresh water outlet and also providing an air inlet and an air outlet for discharging air along with any radon contaminants removed from fresh water to be treated;

connecting a fresh water supply line to the fresh water inlet of the aeration tank, via a contaminated fresh water supply pump, for conveying contaminated fresh water from a contaminated fresh water source to a spray nozzle;

coupling the spray nozzle to the fresh water inlet for receiving the supply of the contaminated fresh water and for spraying the supplied contaminated fresh water as fresh water droplets within the interior of the aeration tank in a desired fresh water spray pattern to increase an exposed surface area of the contaminated fresh water and facilitate an initial stage removal of any radon contaminants contained within the sprayed fresh water particles, and, during operation of the system, the spray nozzle spraying the contaminated fresh water directly on any fresh water which has accumulated within the aeration tank;

locating a sparger within the lower region of the aeration tank, remote from the spray nozzle, and connecting the sparger to a source of air for supplying the air to the sparger in the lower region of the aeration tank, once a desired level of the sprayed fresh water accumulated therein, such that the sparger is completely immerse by the sprayed fresh water accumulated within the lower region of the aeration tank so that the air, supplied by the sparger, permeates through the sprayed fresh water accumulated within the interior of the aeration tank to provide a second stage removal of any radon contaminants contained within the fresh water; and connecting the fresh water outlet of the aeration tank to a re-pressurization pump, via a treated fresh water line, and re-pressurizing the treated fresh water, via the re-pressurization pump, to supply the treated fresh water to an end user facility for subsequent use.

17. The method according to claim 16, further comprising the steps of connecting a contaminated fresh water tank along the fresh water supply line for storing a desired quantity of the contaminated fresh water by the system;

connecting a treated fresh water tank along the treated fresh water line for storing a desired quantity of the treated fresh water for subsequent use by the end user facility; and connecting a bypass valve to both the contaminated fresh water supply line and the treated fresh water line for bypassing the system and supplying the contaminated fresh water directly to the end user facility without treatment by the system.

18. The method according to claim 16, further comprising the step of connecting an electronic control device to:

1) the contaminated fresh water supply pump for controlling the supplying of the contaminated fresh water to the aeration tank;
2) the re-pressurization pump for controlling removal of the treated fresh water from the aeration tank;
3) a low fresh water level sensor, provided within the aeration tank, for sending a signal to the electronic control device indicating that a detected accumulated fresh water level within the aeration tank is low and a supply of additional contaminated fresh water is required in the aeration tank; and
4) a high fresh water level sensor, provided in the aeration tank, for sending a signal to the electronic control device for indicating that a detected accumulated fresh water level in the aeration tank is high and to discontinue the supply of additional contaminated fresh water to the aeration tank.

19. The method according to claim 16, further comprising the step of bubbling air through the sprayed and accumulated fresh water for a time period of about 17 to about 22 minutes prior to supplying the treated fresh water to an end user facility for subsequent use.

20. The method according to claim 16, further comprising the step of spraying the contaminated fresh water at a rate of about 7–8 gallons per minute in which treated fresh water is approximately 95% free of radon contaminants.

* * * * *